United States Patent
Lydecker et al.

(10) Patent No.: US 9,784,817 B2
(45) Date of Patent: *Oct. 10, 2017

(54) METHOD AND SYSTEM FOR DYNAMIC REASSIGNMENT OF AN IDENTIFICATION CODE IN A LIGHT-BASED POSITIONING SYSTEM

(71) Applicant: ABL IP HOLDING LLC, Conyers, GA (US)

(72) Inventors: Stephen H. Lydecker, Snellville, GA (US); Konstantin Klitenik, Cambridge, MA (US); Daniel Ryan, Atlanta, GA (US); Emanuel Paul Malandrakis, Boston, MA (US); Mitri J. Abou-Rizk, Newton, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,410

(22) Filed: Oct. 24, 2016

(65) Prior Publication Data
US 2017/0139033 A1    May 18, 2017

Related U.S. Application Data

(63) Continuation of application No. 14/944,774, filed on Nov. 18, 2015, now Pat. No. 9,530,292.

(51) Int. Cl.
*G08B 1/08*    (2006.01)
*G01S 5/16*    (2006.01)
*H04B 10/116*  (2013.01)

(52) U.S. Cl.
CPC .............. *G01S 5/16* (2013.01); *H04B 10/116* (2013.01)

(58) Field of Classification Search
CPC .................................. H04B 1/00; G01S 1/00
See application file for complete search history.

(56) References Cited

U.S. PATENT DOCUMENTS

2007/0085699 A1    4/2007  Walters et al.
2013/0026940 A1    1/2013  Ganick et al.
(Continued)

FOREIGN PATENT DOCUMENTS

WO    2012093241 A1    7/2012

OTHER PUBLICATIONS

Entire prosecution history of U.S. Appl. No. 14/944,774, filed Nov. 18, 2015, entitled "Method and System for Dynamic Reassignment of an Identification Code in a Light-Based Positioning System.".
(Continued)

*Primary Examiner* — Shirley Lu
(74) *Attorney, Agent, or Firm* — RatnerPrestia

(57) ABSTRACT

In a visual light communication (VLC) or other light based positioning system, a mobile device can detect modulated light emitted by one or more localized artificial lighting devices to obtain an identification (ID) label or code of each lighting device, e.g. that is visible in an image captured by the mobile device camera. The mobile device uses the detected ID code for a lookup in a self-stored or remotely stored table that associates light-source-location information with ID codes, to obtain an estimate of mobile device position. To mitigate against hacking by a third party detecting the ID codes and observing locations to compile its own lookup table, the disclosed examples dynamically alter the assignments of particular ID codes to the lighting devices, while minimizing potential disruption of position determination service for mobile devices due to the changes to ID code assignments.

19 Claims, 11 Drawing Sheets

(56) References Cited

U.S. PATENT DOCUMENTS

2013/0028475 A1    1/2013   Ganick et al.
2013/0141554 A1*   6/2013   Ganick .................... G01S 1/70
                                                           348/61
2013/0163994 A1    6/2013   Iizuka et al.
2014/0273818 A1    9/2014   Sallas
2015/0147067 A1*   5/2015   Ryan ................ H04B 10/25752
                                                          398/118
2015/0280820 A1   10/2015   Breuer et al.

OTHER PUBLICATIONS

"Chapter 28: Multilateral approaches for reliable mobile RFID service systems" In: S.A. Ashon et al: "RFID Handbook," 2008, Taylor and Francis group, XP002753300, p. 513.
International Search Report and Written Opinion mailed Feb. 1, 2017, issued in International Patent Application No. PCT/US2016/061553, 16 pages.

* cited by examiner

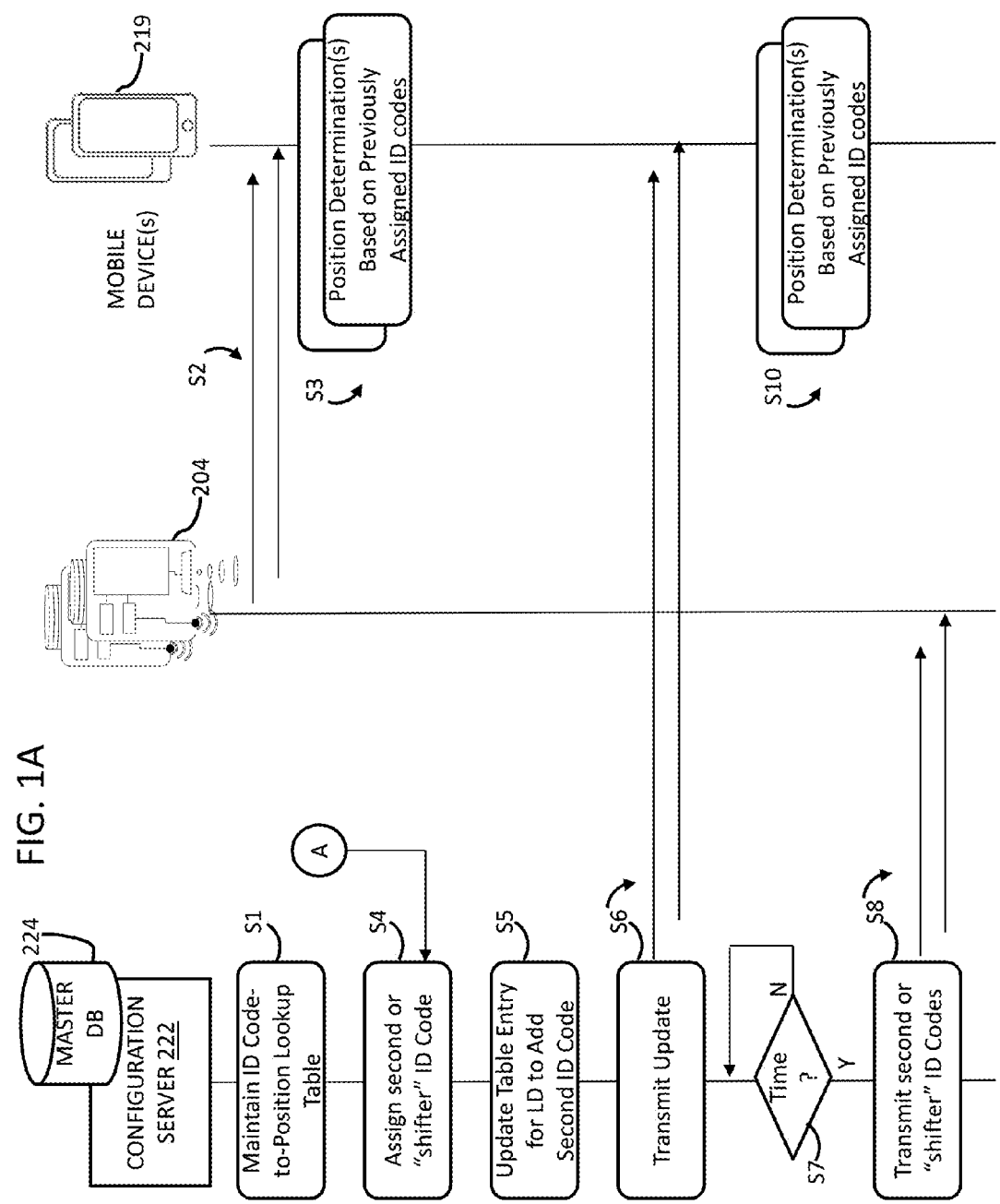

FIG. 6E
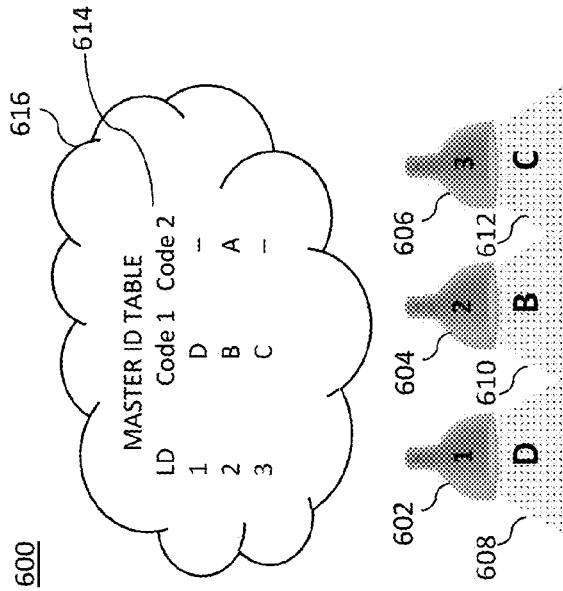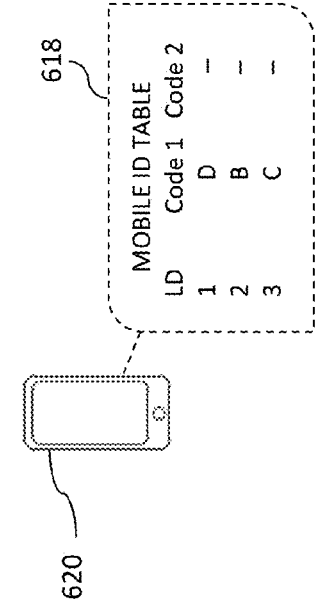
FIG. 6F
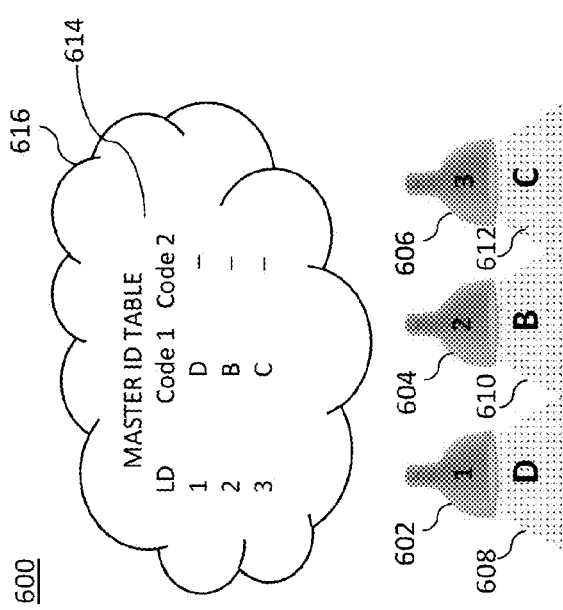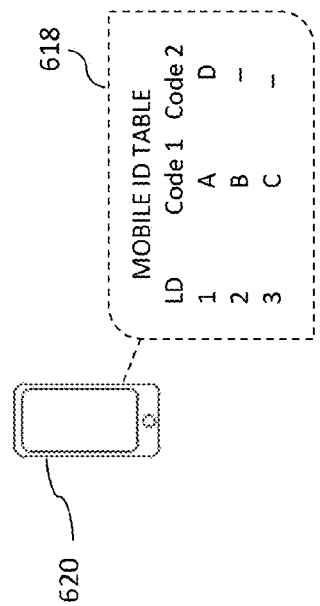

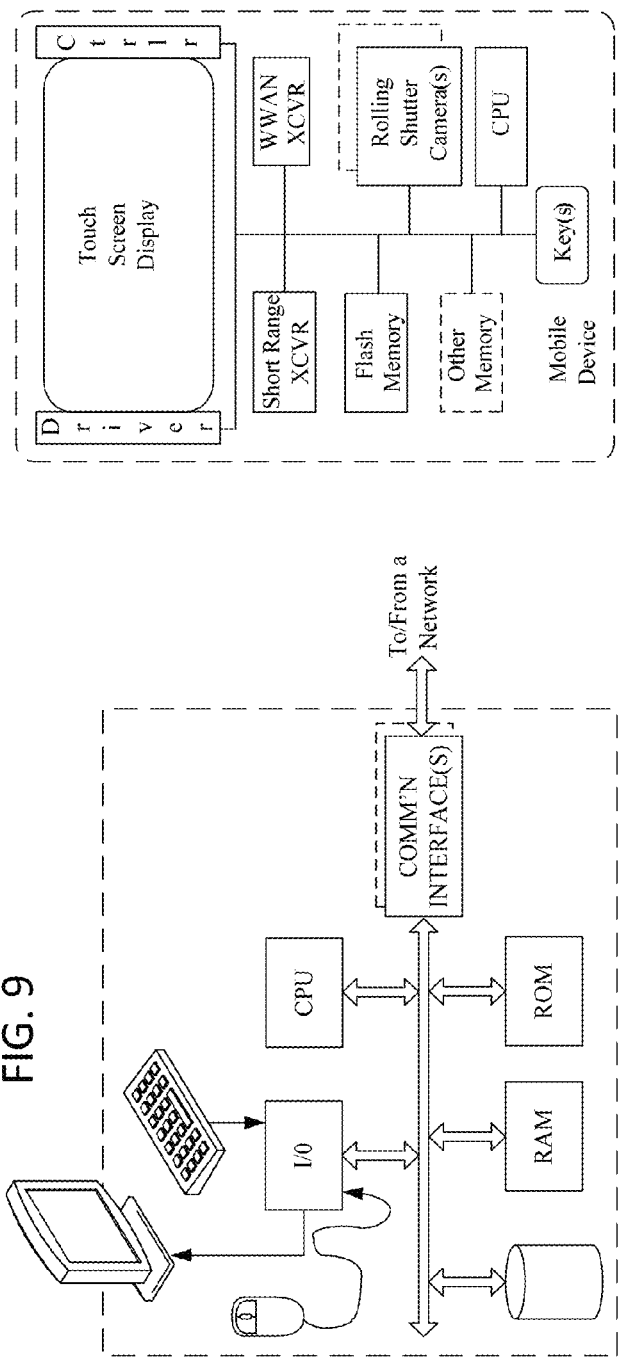
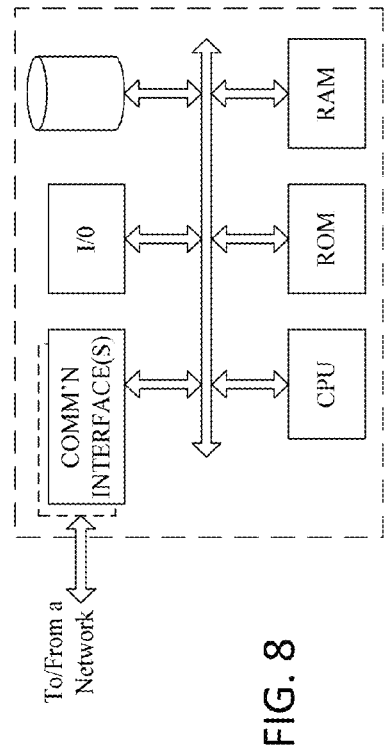

METHOD AND SYSTEM FOR DYNAMIC REASSIGNMENT OF AN IDENTIFICATION CODE IN A LIGHT-BASED POSITIONING SYSTEM

RELATED APPLICATIONS

This application is a continuation of U.S. application Ser. No. 14/944,774, Filed Nov. 18, 2015 entitled "METHOD AND SYSTEM FOR DYNAMIC REASSIGNMENT OF AN IDENTIFICATION CODE IN A LIGHT-BASED POSITIONING SYSTEM," the disclosure of which is entirely incorporated herein by reference.

TECHNICAL FIELD

The examples discussed below relate to techniques and equipment to dynamically alter the assignment of an identification (ID) code to one of the lighting devices of a light-based positioning system, for example, while mitigating the potential for disruption of position determination service for a mobile device due to the change to ID code assignment.

BACKGROUND

In recent years, a number of techniques have been proposed and several systems have been developed and deployed for using visual light communication (VLC) from lighting devices to provide information to mobile devices, to allow the mobile devices to determine estimates of their respective positions in a venue illuminated by the lighting devices. There are advantages of VLC or other light based positioning over other mobile device position determination technologies, particularly for indoor position determinations. For example, optical techniques often are more accurate and/or reliable than other approaches; since light waves are highly directional and do not pass through most materials, therefore a light-detecting device can be presumed proximate to a light source if the source is robustly detectable. Also, as another example of an advantage, optical position estimation may be implemented at indoor facilities for many desirable indoor location based service applications, where signals from global position system (GPS) satellites may be attenuated or blocked to a degree that does not permit sufficiently fast or accurate determinations.

A number of the more recent implementations of light based systems supporting mobile device position determinations configure the lighting devices of the systems to repeatedly modulate light devices outputs with assigned identification (ID) codes. However, the technologies proposed and deployed are still open to further improvement.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIGS. 1A and 1B form a flow chart illustrating an example of a technique for dynamically altering the assignment of an ID code to a lighting device in a light-based positioning system.

FIGS. 6A to 6F schematically illustrate code assignments and re-assignments in a dynamic code procedure.

FIG. 8 is a simplified functional block diagram of a computer that may be configured as a host or server, for example, to function as either of the servers in the system of FIG. 2 or FIG. 3.

FIG. 9 is a simplified functional block diagram of a personal computer or other work station or terminal device.

FIG. 10 is a simplified functional block diagram of a mobile device.

DETAILED DESCRIPTION

Figure 1B:
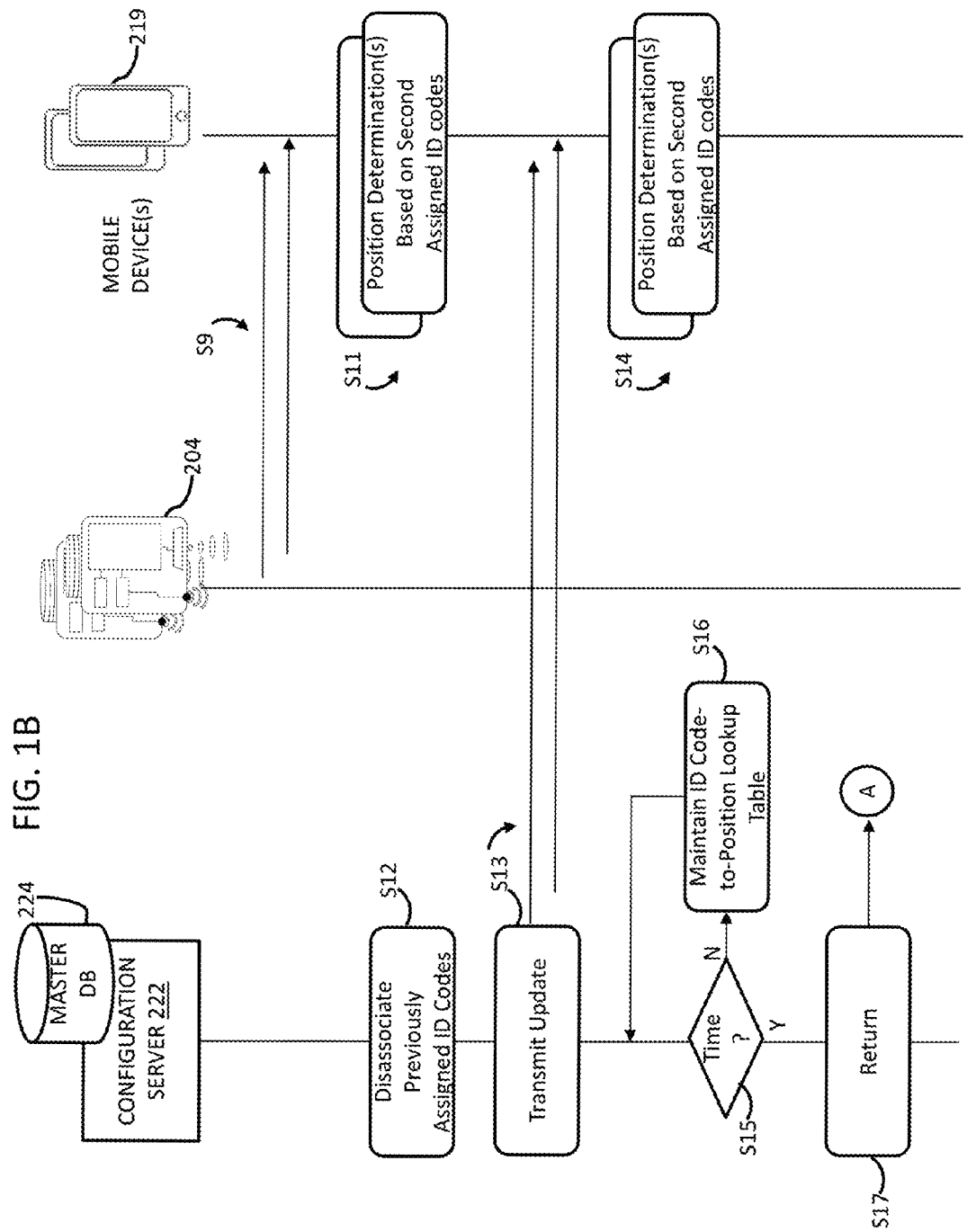

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Light based on optical positioning services are implemented by systems and methods whereby the locations of mobile devices and their users are estimated based on codes and/or other information that the mobile devices obtain from processing of light outputs from lighting devices. Related location based services can provide information or other service capabilities based on the determined estimates of mobile device position.

The term "mobile device" includes all portable devices having a computational capability and a wireless communication capability (e.g., smartphones or other mobile telephones, tablets, wearable computers, portable media players, handheld game players, electronic tags, etc.). Mobile devices that operate with an optical positioning system, such as a VLC system, also include an appropriate optical sensor. Many types of mobile devices are equipped with cameras that may be utilized as the sensor for optical positioning.

The optical positioning may be implemented using outdoor lighting devices, indoor lighting devices or a combination of indoor and outdoor lighting devices. For convenience, the examples below are often discussed in terms of an indoor positioning service type application of the technology.

Also, an "indoor" system is a system that provides positioning services and in some cases additional services over any relatively limited area. The area so served may be partly or entirely confined within a building, ship, mine, or other enclosed structure, but is not necessarily so confined. Hence, an "indoor" positioning system may operate partly or wholly in unenclosed spaces, e.g., over a campus, pedestrian mall, fairground, or the like, where such a service area may also include the interiors of one or more enclosures. Moreover, the spaces or areas served by a single system may not all be contiguous (e.g., the system may distinguish between a number of spaces at somewhat separate locations and support navigation between as well as within those spaces). Also, although reference is made primarily to positioning services that discover and utilize information about mobile device locations in flat "areas" over which a two-dimensional coordinate system is appropriate (e.g., the floor space of a store), the technologies discussed below are applicable to systems discovering and utilizing information about mobile device locations in three-dimensional spaces.

A lighting device for light-based code transmission may be a special purpose device or for such code transmission deployed essentially to serve as a 'beacon' only. In many deployments, however, it is possible to modulate the light output of a source otherwise used for general, artificial illumination in the spaced served by a particular lighting device, so as to integrate the 'beacon' like ID code transmission capability with otherwise typical lighting related functions. Also, although much of the discussion below references visual light or VLC, the light based aspects of the positioning system/service may transmit the code(s) using other light wavelengths or frequencies outside the visible region of the light spectrum.

The term "lighting device" as used herein is intended to encompass essentially any type of device that processes power to generate light, for example, for illumination of a space intended for use of or occupancy or observation, typically by one or more people or other types of living organism that can take advantage of or be affected in some desired manner by the light emitted from the device. A lighting device, for example, may take the form of a lamp, light fixture or other luminaire that incorporates a source, where the source by itself contains no intelligence or communication capability (e.g. LEDs or the like, or lamp ("regular light bulbs") of any suitable type) and an associated modulator and logic circuitry. Alternatively, a fixture or luminaire may be relatively dumb but include a source device (e.g. a "light bulb") that incorporates the logic, communication and modulation capabilities discussed herein. In most examples, the lighting device(s) illuminate a service area to a level useful for a human in or passing through the space, e.g. regular illumination of a room or corridor in a building or of an outdoor space such as a street, sidewalk, parking lot or performance venue. However, it is also possible that one or more lighting devices in or on a particular premises served by a system of lighting devices have other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of artificial light emitting unit.

In light-based positioning systems, a mobile device that can detect modulated light emitted by one or more localized lighting devices may estimate its own location by several methods. In a method used in some optical positioning systems, an optical proper property such as brightness of the light emitted by the light source of each lighting device is modulated so as to repeatedly encode in the modulated property of the light an identification (ID) label or code that is globally or locally distinctive. When light from the lighting device is observed by an appropriately equipped mobile device, the ID code carried in the fixture's modulated light output is detected. Once the mobile device has detected such a lighting device ID code, the mobile device looks up the location information in a self-stored or remotely stored table that associates light-location information with ID codes assigned to lighting devices. Since robust detection by a mobile device of a given modulated light source implies that the mobile device is relatively near the lighting device containing that modulated source, a location estimate for the mobile device can be calculated from the ID code detected lighting devices. Detection of ID codes from multiple lighting devices may allow trilateration or the like to improve the resolution of the position estimate.

In optical position determination systems that utilize such an ID code-lookup-based location estimation, also herein termed "ID lookup positioning," ID codes are first detected by the mobile device(s) and then ID codes are matched to locations by performing a table lookup. The ID code-to-position lookup table should be as current and up-to-date as feasible. For example, if new VLC lighting devices have been installed or ID codes have been reassigned between lighting devices, the ID code-to-position lookup table will be updated to incorporate any such changes. Thus, an authoritative version of the code-to-position lookup table is maintained (e.g. stored and accessed), whether on a central device (e.g., back-end server) or on each mobile device served by the system. Commonly, each mobile device maintains a copy of the ID table in its own memory, at least for one or more indoor locations frequented by the mobile device user. Although the amount of information stored in such an ID code lookup table may be relatively small, the procedures for repeatedly implementing updates and communicating updated information to mobile devices can be time consuming and may create problems, for example, for mobile devices that may not have received a particular update in a timely manner.

A potential weakness or vulnerability of ID-lookup type optical communication based positioning is herein termed "unfriendly mapping." In unfriendly mapping, lighting device ID codes are linked to spatial information by an observer who wishes to exploit that information in ways disadvantageous to the owner/operator of the light based positioning system.

Such detection and matching of ID codes to locations may be achieved by various methods. In one method, the unfriendly mapper traverses a space served, for example, by a VLC positioning system while carrying a mobile device that detects the ID codes of modulated light sources and records corresponding spatial information (e.g., the "lighting device" whose source is sending ID code XYZ is above the jewelry display"). Thus, in this method of attack, the unfriendly mapper builds their own ID code-to-position lookup table. This table may be used in various ways disadvantageous to the owner/operator of the VLC positioning system. In an illustrative scenario, Business A operates an ID code lookup type VLC positioning system on their retail premises, and offers Commodity 1 for sale in that retail space. Competitor, Business B, operates an application on a shopper's mobile device that detects ID codes of modulated light device outputs in the retail space of Business A. When ID table information previously harvested by Business B shows that the shopper is near a display of Commodity 1, the mobile device signals for the shopper's attention and advertises Commodity 1 at a lower price in a store operated by Business B. In short, the marketing potential of the VLC positioning system is hijacked by the unfriendly mapper. Other disadvantages of allowing unauthorized parties access to accurate positional information of mobile devices served by a VLC positioning system may readily be apparent.

It often may not be feasible to defeat unfriendly mapping solely by being secretive about ID table information, for ID table information is in general to be shared with mobile devices served by a light-based positioning system if the system is to function. Preferably, lighting device positional or other related location information related to the lighting devices is disclosed in a manner that enables the positioning system to service its users and prevents or impedes unfriendly mapping. Hence, there is a need for a method and system of creating and distributing ID code table information in a VLC positioning system or other optical position determination system, which impedes unfriendly mapping without interfering with intended system functions.

The concepts disclosed herein, for example, may help to mitigate against hacking by a third party detecting the ID codes and observing locations of lighting devices to compile its own lookup table. Hence, the disclosed examples may dynamically alter the assignments of particular ID codes to the lighting devices. The dynamic code reassignment defeats or impedes unfriendly mapping of a light-based positioning system because maps produced by detecting ID codes of lighting devices and associating those codes with spatial information swiftly become out of date. However, in the detailed examples, the code reassignment also is adapted to minimize potential disruption of position determination service for mobile devices due to the changes to ID code assignments.

For purposes of discussion, the examples shown in several of the drawings and described below relate to systems using lighting devices with ID code-modulated light outputs that also have some wireless communication capability. In some cases, the wireless communication capability of the lighting devices may only be used for local communication, e.g. with another device that provides network communication with a server or the like for dynamic ID code assignment purposes. In other cases, however, the lighting devices form a wireless mesh network that in turn provides network communication with a server or the like for dynamic ID code assignment purposes. By way of example, US Patent Application Publication No. 2015/0147067 A1 to Ryan et al. discloses various implementations of light-based mobile positioning systems that also utilize radio-frequency (RF) wireless communication to/from the lighting devices, aspects of the RF wireless operations (e.g. dynamic changing of the radio-frequency ID code of a wireless node), as well as location based service applications using such systems; and the entire disclosure of that publication is incorporated herein by reference.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

Reference now is made in detail to the examples illustrated in the accompanying drawings and discussed below. Although some of the discussions below describe the examples in terms of visual or VLC, it will be appreciated that the examples also apply to other light as discussed earlier.

Together, FIGS. 1A and 1B form a flow chart of an example of a procedure for changing a code assignment in a light system that supports estimation/determination of mobile device position via modulated light emissions, in the examples, via visible light communication (VLC). Examples of the elements of the system are discussed in more detail later. For purposes of discussion of this first processing example, the combined flow chart shows several components that perform aspects of the overall illustrative procedure. More specifically, the drawings show a computer running a server program, in this case to perform lighting device configuration operations, which we will refer to as a configuration server or server computer 222. The drawing also shows lighting devices 204 with modulatable light sources as well as mobile devices 219 that may utilize the position determination capability by receiving and demodulating light from one or more of the lighting devices 204.

The illustrated example of a method involves step S1 in which the configuration server 222 maintains an identification (ID) code-to-position lookup table for the light-based positioning system, as part of the master database (DB) 224. The lighting and positioning system has some number of lighting devices 204; and the lookup table includes an entry for each respective lighting device 204 of the lighting/positioning system. The table entry for each lighting device 204 contains an ID code previously assigned from among a group of available identification codes.

The table entry for each lighting device 204 also contains some position related information associated with the particular lighting device that can be retrieved via a lookup in the table using the assigned ID code as a search term or index. The position related information associated with the particular lighting device in the table entry may indicate location of the lighting device, e.g. by geo-spatial coordinates or by other type of coordinates used in a particular premises served/illuminated by the lighting system. As another example, the position related information associated with the particular lighting device may relate to features, goods, services or the like within the premises offered or located in the vicinity of the lighting device.

In general, a control capability of the VLC positioning system, such as the central processing unit of the computer implementing configuration server 222, reads out ID information from the master ID table at various times and can command independent re-set of the ID code broadcast by each light in the system. Such commands may be transmitted through a wired or wireless communication capability.

At this time in the process flow, the assigned codes have been communicated to the lighting devices 204. Hence, each lighting device 204 uses its previously assigned code for modulation on a light output of the respective lighting device (shown as arrows S2). In general, Each lighting device 204 in the positioning system modulates its brightness in a manner that frequently re-broadcasts the ID code assigned to the lighting device. The mobile devices 219 can, when desired, receive light from one or more of the lighting devices 204, demodulate the received light to recover the code(s) and use one or more such received/demodulated codes in position determinations. Typically, each mobile device 219 will have received and stored some or all of the current version of the lookup table with the previously assigned codes. Hence, at this point in the operations (see S3), the codes modulated on light outputs of the lighting devices 204 and for table lookup functions in the mobile devices 219 for position estimations or retrieval of other position related information from the table are the previously assigned ID codes maintained in the lookup table in the database.

The example uses dynamic changes to code assignment to address the limitations of existing VLC ID mapping methods by destabilizing lighting device ID code-to-position mapping in a manner that impedes unfriendly mapping.

Specifically, the example technique dynamically alters the assignments of particular ID codes to lighting devices in a nonobvious, non-predictable manner, and does so with little or no interruption of services provided by the VLC based optical positioning system to intended users.

Hence, in the illustrated process flow, at an appropriate point in time to impede unfriendly mapping, the method involves the configuration server computer 222 assigning a previously unassigned second ID code from among the group of available identification codes to one lighting device (LD) of the lighting devices 204 in the system (S4), and updating the entry for that one lighting device in the table to add the second ID code (S5). Since this update of the one entry involves an addition of a second code, the entry in the lookup table for the one lighting device continues to include the ID code previously assigned to the one lighting device. Although S4 and S5 show only one lighting device (LD) entry updated by the addition of a second ID code, these steps may add second ID codes (or be repeated to add second ID codes) to the records in the table for one, two or more of the lighting devices 204.

In various examples, a finite number of ID codes is available for assignment to a finite, smaller number of modulated light sources. Let the total number of available ID codes be $C_T$ and the number of lighting devices 204 be L, where $C_T > L$. Typically, $C_T$ is a power of 2 whose exponent is the number of bits assigned to a binary ID codeword of fixed length. Larger $C_T$ enables the assignment of unique ID codes to a larger number of lighting devices, but also entails a longer codeword, which takes longer to broadcast via VLC and so slows system response. Thus, in the design of real systems, the size of $C_T$ tends to be constrained in the upward direction by system performance criteria and in the lower direction by the number of lighting devices 204 that the system potentially can accommodate.

If in various examples each lighting device 204 emitting modulated light is to be uniquely identified by one or more ID codes, at least L of the $C_T$ possible codes are assigned (one code to each light). When L of $C_T$ codes are assigned to L lighting devices, a number of surplus or additional codes $C_S = (C-L) \geq 1$ will remain. These $C_S$ extra codes may be employed to enable the dynamic, unpredictable reassignment of ID codes to one or more of the lighting devices 204 of the system, during otherwise normal system operation in a manner that impedes unfriendly mapping. In various examples of an unfriendly-mapping-resistant VLC positioning system, such reassignment occurs as follows.

As an example, in step S4, dynamic ID code reassignment occurs in a manner that is cyclic, though not necessarily periodic. At the beginning of an ID reassignment cycle, N ID codes, herein termed "second codes" or "shifter codes," where $1 \leq N \leq C_S$ and $1 \leq N \leq L$, are assigned in the master ID code-to-position lookup table to N of the lighting devices 204 in addition to the N ID codes previously assigned to those N lighting devices 204. Each of the N lighting devices 204 may be randomly selected for code reassignment, or selected according to a regularly rotating order, or selected by some other algorithm. As a result of the second code assignment, each of the N lighting devices 204 is now associated with two ID codes in the master ID table. Stated another way, the entry for each of the selected N lighting devices 204 contains both an ID code previously assigned to the respective lighting device as we well as a shifter code newly assigned to the respective lighting device from among the pool of previously surplus codes $C_S$ of the overall set of codes $C_T$. For example, a particular lighting device, lighting device A, originally assigned ID code, Code 1, is now associated with two ID codes, Code 1 (still being broadcast) and a shifter code, Code 2. Hence, the entry in the table in the master table contained in database 224 for that particular lighting device now includes both the previously assigned ID Code 1 and the new/second "shifter code," Code 2.

After the update (S5) of one or more LD entries in the lookup table to add the new shifter ID code(s), then in step S6, the updated version of the ID table is transmitted wirelessly to mobile devices 219 being served by the VLC positioning system, for installation in those mobile devices 219. This table update communication includes the update of the entry for the each (one or more) of the N lighting devices 204 to indicate assignment of the respective second ID code to each one the N of the lighting devices 204 along with the ID code previously assigned to the respective lighting device.

In some examples, the update transmission in step S6 may be done more or less simultaneously or synchronously to all mobile devices 219 being served. In other examples, the update transmission in step S6 may be done on a piecemeal basis, e.g., a mobile device 219 downloads an updated ID table whenever the mobile device 219 enters an area served by the VLC positioning system. At the completion of this step in the code reassignment cycle, a software component (e.g., a client app or other application) of the VLC positioning system that is running on the mobile device 219 will now associate whichever one of Code 1 or Code 2, if either is detected in modulated light, with the Lighting Device (LD) 1; and any other information position or other location related information associated with LD 1 in the version/portion of the master ID table stored in the mobile device 219. However, in our example, LD 1 still continues to broadcast Code 1.

Step S7 is a time delay loop that causes the server 224 to wait a set period to allow sufficient time to pass to make it acceptably probable that all mobile devices 219 presently being served by the VLC positioning system have received an updated ID code table. The length of this waiting time will depend on parameters of the precise system of ID table updating chosen for the mobile devices 219, such as number of N codes and lighting devices involve and thus number N of updated lighting device table entries, and on various other details of the system implementation. In some examples, rather than wait a predetermined time, confirmations of ID code table update may transmitted from mobile devices to a control capability of the VLC positioning system such as the configuration server 222. In this later example, the loop in S7 may wait until the server 222 receives a set number of confirmations or receives confirmations from a set number or percentage of the mobile devices 219.

The method also causes each of the N lighting devices 219 that has been assigned a new second ID code to begin modulating light output to carry the respective second ID code instead of the ID code previously assigned to the particular lighting device. In the example, after passage of the time in step S7, the flow branches to step S8. In the example, step S8 involves now transmitting new code assignments to each of the N lighting devices to which a second ID code (a shifter code) has been assigned. The example of step S8 involves transmitting instructions to the impacted ones (N) of the lighting devices 204 to store and start using their respective second or shifter ID codes, although other procedures may be used. For example, the newly assigned shifter ID codes may be sent to the impacted lighting devices earlier in the process along with an instruction to install and begin using the codes at the end of the time period (e.g. to implement the timer similar to step S7 in the individual N lighting devices).

Each of the N lighting devices 204 to which a second ID code (e.g. a shifter code) has been assigned ceases to broadcast its first (previously assigned) ID code; and in step S9, each such lighting device begins to broadcast its second ID code. For example, Light 1 ceases to broadcast Code 1 and begins to broadcast Code 2. This switch in transmitted ID codes may occur after an internal timer of each light indicates that sufficient time has passed since the updating of the ID of the respective lighting device, when commands are received by the light from the control capability of the VLC positioning system (as in S7 and S8), or according to some other system governing event timing.

In the example procedures, there is a transition period while the installation of the update may not yet be completed for all potentially impacted mobile devices 219 and/or the affected lighting devices 204 may not yet have begun modulating light outputs to carry the second ID codes, yet any mobile device 219 with the update sent at step S6 can perform a lookup in the table to determine mobile device position based on whichever one of the ID codes assigned to a lighting device 204 is demodulated from reception of the light output of a particular one of the N lighting devices 204, based on the lookup table entry for that lighting device containing both ID codes assigned thereto.

As part of that transition period in the example in FIGS. 1A and 1B, during the interval between the update transmission at step S6 and a later changeover of the N lighting devices to transmit the second codes, the previously assigned codes were still available in the table stored in the mobile devices 219. Hence, as shown at step S10, the mobile devices 219 are still able to perform table lookups using the previously assigned codes for position determinations or other information retrievals from the table.

After S9, however, the N of the lighting devices 204 assigned second ID codes stop using the previously assigned codes and only send the newly assigned second ID codes. However, because the table includes both codes for each of the N lighting devices 204, the table in the mobile devices 219 allows continued processing for position determinations. As shown in step S11, with latest update to the lookup table in the mobile devices 219, from transmission step S6, any mobile device 219 with the stored table update can detect a newly implemented transmission of the second assigned ID code from modulated light output of any of the N lighting devices 204, to continue to perform position estimations and/or obtain position or location related information from or based on the table contents.

In step S12, the N former previously assigned codes of the N lighting devices 219, now no longer being broadcast, are disassociated from the N lighting devices in the master ID table 224. The further updating step changes the entry for the each lighting device 219 affected in the reassignment and update in steps S4-S5 a second time to remove the respective ID code previously assigned to that lighting device. After step S12, the entry in the lookup table for each of the N affected lighting devices 219 includes the second ID code as the only ID code assigned to the respective lighting device.

This further change is communicated (transmission step S13) through the network communication to one or more mobile devices 219, to indicate removal of the ID code previously assigned to the each of the N lighting devices to disable a mobile device from performing a lookup in the table to determine mobile device position based on the ID code previously assigned to the one lighting device. This additional update essentially ends the transition period and will typically occur when the installation of the update should be complete and the N lighting devices have begun modulating light output from those lighting devices to carry their newly assigned second ID codes. Similar to the communication in step S6, the updated version of the ID table is transmitted wirelessly in step S13 to mobile devices 219 being served by the VLC positioning system, for installation in those mobile devices 219. In some examples, the update transmission in step S13 may be done more or less simultaneously or synchronously to all mobile devices 219 being served. In other examples, the update transmission in step S13 may be done on a piecemeal basis, e.g., a mobile device downloads an updated ID table whenever the mobile device enters an area served by the VLC positioning system.

As represented by previously discussed step S11, the mobile devices 219 were still able to execute ID code lookups without the update from Steps S12 and S13, during the entire transition period, because the earlier code table update configured the entries for the N lighting devices to include both previously assigned ID codes and second shifter codes for the N lighting devices. Thus, during the transition period from step S6 to step S13, the first update continuously enabled the mobile devices 219 to perform the lighting device ID code lookups for position estimations and related location information retrieval. This concurrent assignment of the two ID codes to each device re-assigned during the procedure, for the transition period, mitigates against potential disruption of the position service due to the code re-assignment operations.

As shown at S14, after the second update transmission (step S13), the continued inclusion of the second ID code(s) in the table entries enables a mobile device 219 to perform a lookup in the table to determine mobile device position to lookup and retrieve other location information, based on the second ID code(s).

ID codes can be re-used later. Hence, step S15 implements another timer. The period of time for timer S15 may be fixed or may vary in different cycles through the ID code reassignment procedure. Variations may be random or algorithmic. Until the time that the period monitored in step S15 expires, the configuration server computer 222 maintains the ID Code-to-Position Lookup table in the latest state (step S16) in the database 224; for example, with a single ID code for each lighting device, where the N lighting devices are assigned and continue to use the shifter codes. When an appropriate time delay expires, process flow branches from S15 to a return step S17, which returns the process to step S4 for new second code assignments. Essentially, the reassignment cycle may be repeated. However, during that subsequent reassignment cycle, the ID codes previously assigned to the first N lighting devices are disassociated and available for reuse as shifter codes for new assignments to another N lighting devices.

As outlined above, a method like that of FIGS. 1A and 1B can change assignment of an ID code for a single one of the lighting devices 204, in each cycle of the method; the method can change assignment of ID codes for some but not all of the lighting devices 204, in each cycle of the method; or the method can change assignment of ID codes for all of the lighting devices 204, in each cycle of the method. How many of the code assignments may be changed in each cycle is only limited by the number of initially unused codes available for assignment as shifter codes during each cycle in comparison to the number of lighting devices 204 transmitting ID codes in the particular lighting system.

Figure 2:
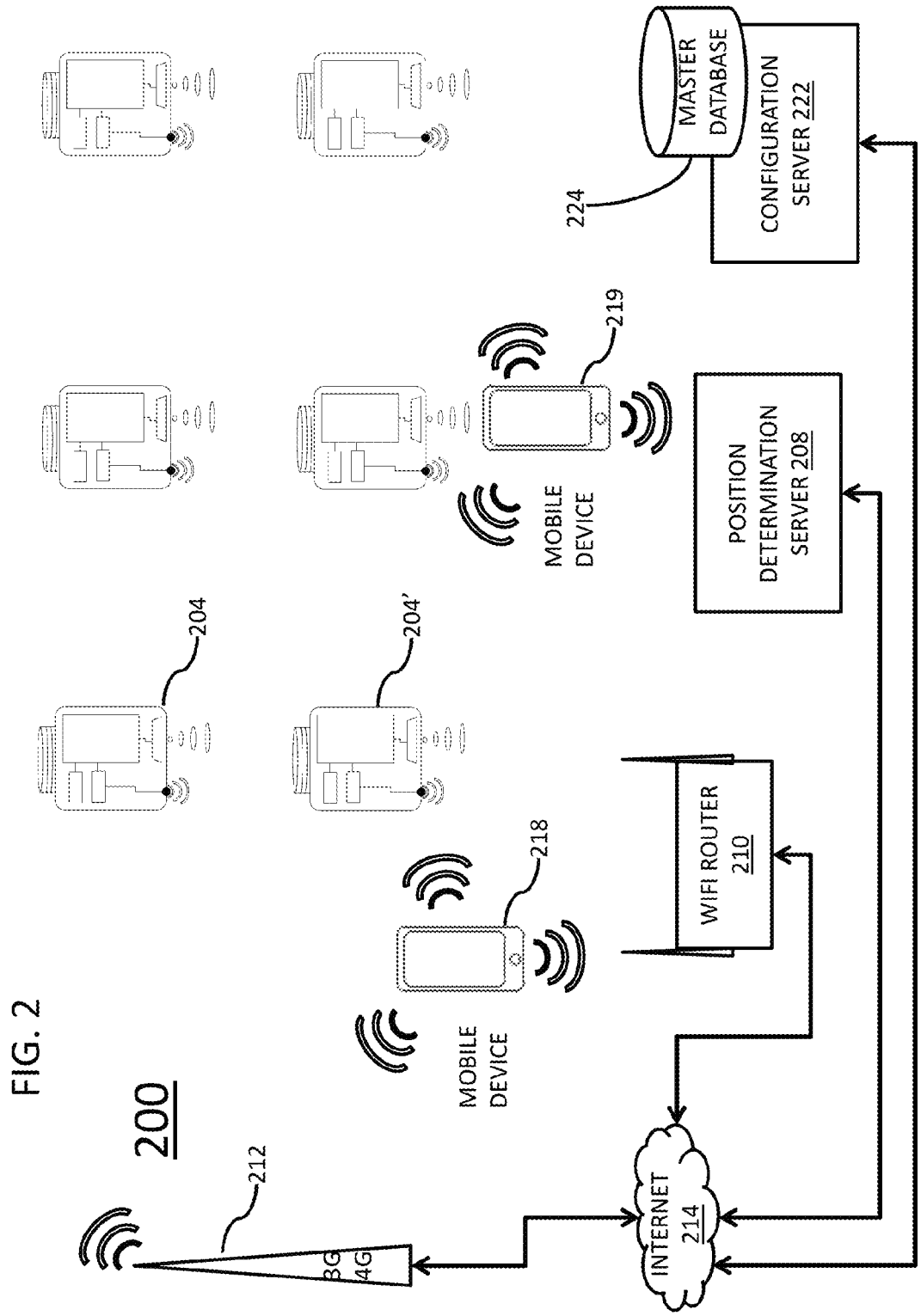
FIG. 2 depicts a system of lighting devices and network connected resources supporting a light-based positioning service for one or more mobile devices.
Figure 3:
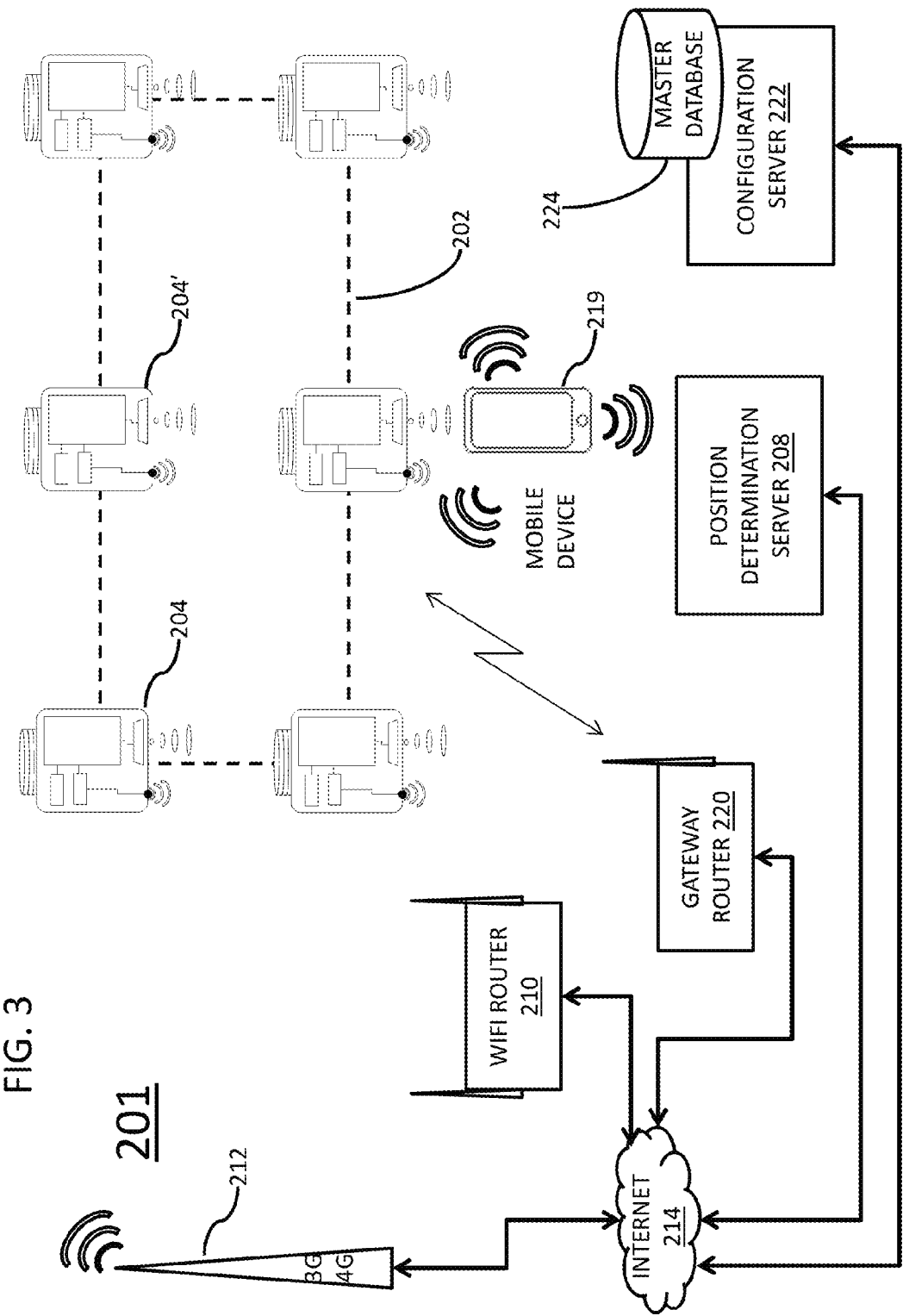
FIG. 3 depicts a system of lighting devices and network connected resources similar to that of FIG. 2, wherein the lighting devices also are arranged in an ad hoc wireless mesh-type network.

FIGS. 2 and 3 show somewhat different variations 200, 201 of a lighting and positioning system and components in communication with such a lighting and positioning system, wherein the lighting devices 204 have the capability to modulate output of the light sources thereof, e.g. for visual light communication (VLC) such as for position related operations. The lighting and positioning system includes the actual lighting devices 204 and other resources such as servers 208 and 222 and master database 224 that interact with the lighting devices 204 for lighting or position-related functions. Other typical lighting system elements such as wall controllers and/or a centralized (e.g. building or campus wide) lighting controller are omitted for convenience.

The lighting devices 204 in our examples include wireless transceivers, such as radio-frequency transceivers, for various communication functions, although cable or optical fibers communication resources could be used. In the overall system 200 shown in FIG. 2, a mobile device 218 or the like communicates with one or more of the RF enabled lighting devices 204 over a short range RF wireless link, for example, to implement communication aspects of a process like that discussed above relative to FIGS. 1A and 1B. In the overall system 201 shown in FIG. 3, however, the RF enabled modulatable lighting devices 204 form an ad hoc mesh-type network 202 and optionally/temporarily communicate through the Internet 214, e.g. via a gateway router 220, to implement communication aspects of a process like that discussed above relative to FIGS. 1A and 1B.

A number of the elements shown in these two drawings are similar, indicated by the same reference numerals and will generally be described together with reference to both of FIGS. 2 and 3 below. The first of these drawings shows two mobile devices 218 and 219, whereas the second of these drawings shows only one of the mobile devices 219 discussed above relative to FIGS. 1A and 1B. The devices 218, 219 are similar in structure and functional capabilities, but the device 218 is used in this example for an additional or alternative purpose related to the dynamic lighting device ID code assignment techniques.

In these system examples (FIGS. 2 and 3), the mobile devices 219 or 218 have typical RF wireless communication transceivers, e.g. for communication via base station 212 of a public-carrier's mobile communication network and/or for wireless local area data network communication (e.g. WiFi) with a local router 210 in or near the premises served by the lighting devices 204. These communication capabilities support normal data communications applications for the mobile devices 218, 219. These communication capabilities, however, may also be used in some functions/services in relation to VLC based positioning. For example, the configuration server may communicate updates of entries in the master table database 224 to the mobile devices 219 and possibly the device 218, as in steps S13 and S16 in the process example of FIGS. 1A and 1B. The mobile devices 219 (and possibly the device 218) include cameras and are programmed or otherwise configured to demodulate lighting device ID codes from images captured by the cameras for use in table lookups and related position determination and/or information retrieval functions based on the ID codes received from the lighting devices 204. The mobile devices may use their inherent RF wireless communication capabilities to also communicate through the Internet with other relevant resources represented by position determination server 208, e.g. for assistance in precise position determinations based on multiple ID codes alone or in combination with mobile device orientation data and/or to obtain other position or location related services such as routing instructions or product or service promotions.

In the systems 200, 201, the mobile devices 219 function essentially as user devices as described earlier. Positioning related communications of those devices 219 may use the cellular mobile network via a base station 212 or local wireless data network service like WiFi via router 210 provided at or near the relevant premises. As noted, the networked version of the system 201 shown in FIG. 3 implements a wireless (e.g. Bluetooth) ad hoc network 202 formed by the wireless-enabled lighting devices 204. Assuming that ad hoc network 204 has a link to a compatible wireless gateway router such as 220, then the ad hoc network 202 and the gateway router 220 may offer yet another data communication path for the mobile devices 219, including for data communications related to the positioning and location based services.

Turning now more specifically to code assignment functionalities, in FIG. 2, the mobile device 218 may communicate over a local data link, such as Bluetooth, with an individual one of the lighting devices 204' to which code updates are being communicated. An application or other program stored on and running in the mobile device 218 allows the device 218 to set up communications between the lighting device 204' and the configuration server 222 and perform code change operations like those discussed above. For example, during a re-assignment procedure, such a link might be used to communicate a second or 'shifter' code to the lighting device 204' in step S8 of the process of FIGS. 1A and 1B. This operation to deliver a newly assign shifter code to a lighting device may be repeated for one or more of the other lighting devices 204.

FIG. 3 depicts a configuration of RF enabled modulatable lighting devices arranged in an ad hoc mesh-type network 202 and connected to Internet resources through a nearby gateway router 220. Although not shown, the ad hoc mesh-type network 202 may alternatively be temporarily connected to Internet resources through a nearby mobile device. Modulatable lighting devices 204 may be configured so that a modulated light signal provided from the light of each device 204 may be distinguished from modulated light signals produced by other nearby lighting devices 204 as well as from light outputs from other unmodulated sources or lighting devices (not shown). When such modulating lighting devices 204 are configured with RF capability and form a wireless network they may communicate configuration information from lighting device to lighting device.

A network capability as depicted in FIG. 2 may include access through a mobile device or other RF enabled device to external (non-mesh) networks. In an example where the mobile device temporarily serves as the gateway, software installed on a mobile device that is in contact with a non-mesh communications network (e.g., an app voluntarily installed on a smart phone that is connected to the Internet via WiFi and/or to a cell phone network) facilitates the mobile device to act as a network-to-network gateway. In the example, however, the system 201 includes another suitable network-network gateway 220 installed in the vicinity of one or more of the lighting devices 204 of the system. A network-network gateway 220 in close proximity to one of the networked lighting devices 204 may enable communication from at least one of the lighting devices and thus the network 202 through any suitable wireless networking link such as Ethernet, Zigbee, and the like.

In the example of FIG. 3, a mobile device that may have Bluetooth and WiFi and/or cellular communication capabilities may act as a gateway for communicating data to/from RF enabled modulatable lighting devices. If the lighting devices are configured into a network 202 with access via a gateway such as gateway router 200, it may be possible for an Internet resource, such as a position determination server 208, to communicate to a networked lighting devices 204 or 204' by passing data through the Internet 214. This may allow communication of information collected from mobile devices via the RF capability (e.g., identities of devices/users that pass through the area) by one of the lighting devices to a remote server, such as server 208. Of note for purposes of the lighting device ID code processing, this communication capability also allows the configuration server to communicate with one or more of the lighting devices 204' to communicate a respective second or 'shifter' code to each such lighting device 204' in step S8 of each cycle of the process of FIGS. 1A and 1B.

Use of mobile devices as gateways between a VLC+RF system and another network (e.g., wireless mesh) may be opportunistic: e.g., mobile devices of customers who have installed an app related to the VLC+RF mesh may be opportunistically enlisted as gateways as the devices move in and out of the mesh's working space. Such a gateway function may be used, for example, to effectively increase the bandwidth of data reporting by mesh nodes to a server/controller, since under various conditions packets can be communicated more quickly through a gateway than through a series of mesh-node retransmissions. Gateway transmission may be used alternatively or additionally to transmission through a mesh controller node connected to a non-mesh network: e.g., upon failure of an external-connection node or device, a mesh may still be enabled to communicate with a server/controller device acting a gateway, carrying on its various functions while calling for diagnosis and repair of the failure.

In various examples, the position determination server 208 is a general-purpose mesh server and controller (back end) that performs functions other than or additional to position determination, issuing commands to the RF and/or lighting capabilities of one or many network nodes, polling network nodes for information garnered from sensors, and so on. A general-purpose back end may be enabled to understand the locations, movements, and other aspects of mobile devices and other assets within the service area of the VLC+RF network mesh.

Illustrative capabilities include inventorying, assisted navigation and reality augmentation, RF asset tag location tracking, robot and drone tracking, time-of-day-based control, real-time user-tailored control of active assets (e.g., video displays), security management, routine customer assistance, emergency assistance, ambience adjustment (e.g., music, lighting, and other environmental adjustments in response to sensed user behaviors), and more. In another example, routine scan (advertising) packet broadcasts from Bluetooth-capable mobile devices are detected by the RF capability of nodes, enabling a mode of position estimation of the mobile device based on received signal strength indication (RSSI) and/or node detection pattern. Such estimates may be combined with estimates based on detection of VLC beacons by a light-sensing capability of the mobile device, e.g., after the device user is prompted to expose their device to light based on detection of their presence by the RF mode.

The configuration server 222 may be implemented as additional programming on the some general purpose computer implementing the position determination server 208. Alternatively, the configuration server 222 may be implemented on a separate network connected general purpose computer platform. Either one or both of the servers 208, 222 may be implemented in a distributed fashion on multiple network connected computers, e.g. to adequately serve a particular traffic load and/or to provide some level of redundant capacity for peak load or for use in the event of a failure of a primary server resource. The master database 224 may be implemented in a storage device of the general purpose computer(s) that implements the server 222 or the server 208, or the master database 224 may be implemented in a network connected storage device accessible to the appropriate general purpose server computer(s).

Figure 4:
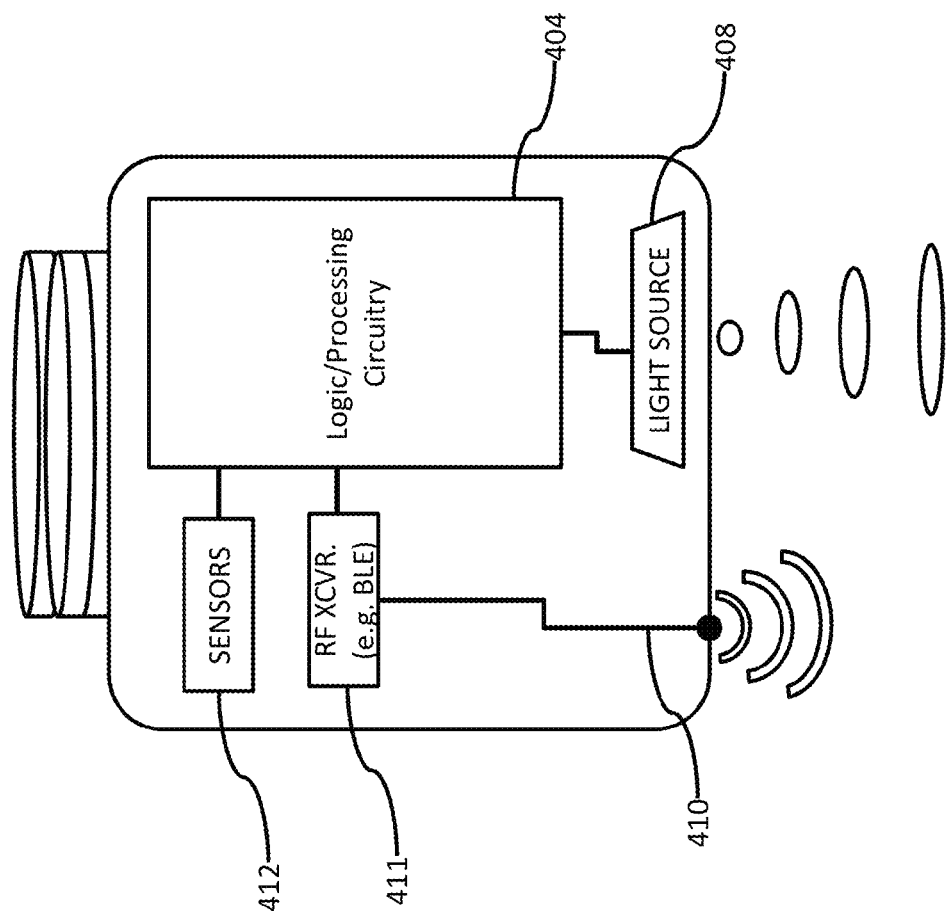
FIG. 4 is a simplified functional block diagram of an RF enabled modulatable lighting device that may be used in one of the systems of FIGS. 2 and 3.
Figure 5:
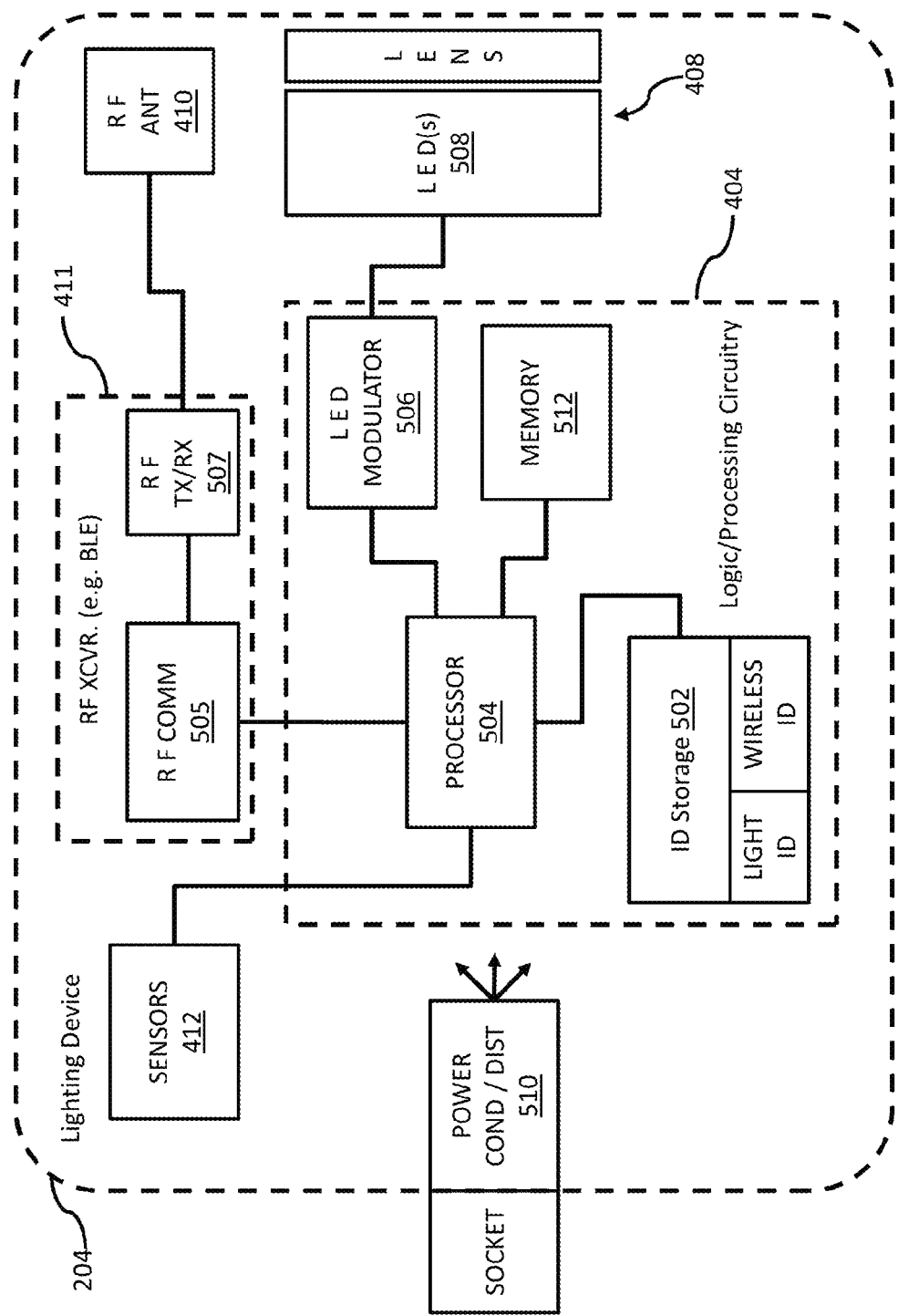
FIG. 5 is a somewhat more detailed functional block diagram of the example lighting device.

FIG. 4 is a somewhat schematic illustration and a somewhat block diagram type representation of one of the lighting devices 204; and FIG. 5 is a somewhat more detailed functional block diagram showing possible implementations of several elements of the example of the lighting device 204 of FIG. 4. Reference numbers used in common in both these drawings refer to the same items. For convenience, the description of these examples will refer to both drawings together, unless otherwise noted.

The example of a lighting device 204 in FIGS. 4 and 5 includes logic and/or processing circuitry 404 to drive and control operations of a light source 408 and control operations of other elements of the device 204. The light source 404 may be any suitable device capable of generating light in response to power that can be modulated. In the example of FIG. 5, one or more light emitting diodes (LEDs) 508 form the light source 408. The device 204 may include an optical processing element coupled to process the light output from the LEDs 508 that form the light source 408. Although other optical processing elements may be used, such as diffusers, reflectors and the like, the example of FIG. 5 shows a lens.

The logic and/or processing circuitry 404 may include elements such as a secure (possibly encrypted and/or key locked) ID storage 502, a processor 504, a modulator (LED modulator 506 in the example of FIG. 5) to supply and modulate power to the source 408, and a memory 512 as a storage device for programming and data. The secure ID storage 502 may be a separate physical storage device as shown or may be a secure section of the memory 512.

The secure ID storage 502 will store at least one lighting device ID code currently assigned to the particular lighting device 204, which the processor 504 uses to control the modulator 506 so that the lighting output from the LEDs 508 carries the assigned lighting device ID code. At least in some transitional operations, the secure ID storage 502 may store two lighting device IDs, e.g. a previously assigned lighting device ID code as well as a newly assigned shifter code stored before replacement/deletion of the previously assigned lighting device ID code. For RF operations, the lighting device 204 typically will also have one or more wireless ID codes, which may also be stored secure ID storage 502. Alternatively, a wireless device ID code may be burned into or otherwise relatively permanently stored in the applicable RF communication circuitry.

Although the light modulation could be optical and coupled to the output of the source 408 so as to vary a characteristic of light output before emission thereof to illuminate the premises; in the examples, the logic and/or processing circuitry 404 varies an aspect of power applied to the light source 408 to modulate the light generation by the source 408. In the LED example of the lighting device 204 shown in FIG. 5, the modulator 506 may be a controllable driver of a capacity appropriate for the number of and type of LEDs 508 that together form the light source 408, where the driver circuit forming the modulator 506 is sufficiently controllable to modulate the light output according to the modulation scheme used by the lighting devices 204 and detectable by the mobile devices 219.

Although purpose built logic circuitry could be used, the processor 504 typically is implemented by a programmable device such as a microprocessor or a microcontroller, configured to execute programs and process data that facilitate modulation of light from one or more LEDs lighting devices 508. The ID storage 502 and memory 512 may be implemented as separate circuit elements coupled to/accessible by the processor 504, e.g. if the processor is a microprocessor type device. A microcontroller typically is a 'system on a chip' that includes a central processing unit (CPU) and internal storage; therefore a microcontroller implementation might incorporate the processor 504, ID storage 502 and memory 512 within the microcontroller chip.

The processor 504 controls the LED modulator 506 to vary the power applied to drive the LEDs 508 to emit light. This control capability may allow control of intensity and/or color characteristics of illumination that the source 408 provides as output of the lighting device 204. Of note for purposes of discussion of position system operations, this control capability causes the modulator 506 to vary the power applied to drive the LEDs 508 to cause code modulation of light output of the light output of the source 408, including modulation to carry a currently assigned lighting device ID code from the secure storage 502. The processor and/or modulator may be configured to implement any of a variety of different light modulation techniques. A few examples of light modulation techniques that may be used include amplitude modulation, optical intensity modulation, amplitude-shift keying, frequency modulation, multi-tone modulation, frequency shift keying (FSK), ON-OFF keying (OOK), pulse width modulation (PWM), pulse position modulation (PPM), ternary manchester encoding (TME) modulation, and digital pulse recognition (DPR) modulation. Other modulation schemes may implement a combination of two or more modulation of these techniques.

As noted, the lighting devices 204 in our examples utilize wireless links to communicate, although other communication media and technologies may be adapted to carry communications discussed herein to and/or from the modulatable lighting devices 204. Hence, our wireless example of FIGS. 4 and 5 includes a radio frequency (RF) wireless transceiver (XCVR) 411 coupled to the logic and/or processing circuitry 404. The transceiver 411 in turn is coupled to an RF transmit/receive antenna 410 that may facilitate communication over wireless RF signals to and/or from other similarly equipped proximal devices, such as other lighting devices 204, mobile devices 218 or 219, wireless gateway router 220 or other wireless routers or relays, wireless enabled computing devices generally, RF equipped items such as appliances, tools, entertainment devices, RF tags, RF enabled network access points, multi-radio devices, and the like. The RF communication capability offered by transceiver 411 and the antenna 410 supports the various data communications of the lighting device 204 discussed herein, including those related to ID code assignment.

The RF transceiver 411 may conform to any appropriate RF wireless data communication standard such as wireless Ethernet (commonly referred to as WiFi) or Zigbee. In the example, however, the RF transceiver 411 is a Bluetooth wireless transceiver, more specifically conforming to the Bluetooth Low Energy (BLE) standard. At a still relatively high level, the BLE transceiver 411 may include RF communication circuitry 505 coupled to the processor 504 and RF transmit (TX) and receive (RX) physical layer circuitry 507 coupled to the RF transmit/receive antenna 410.

The lighting device 204 of FIGS. 4 and 5 may further include one or more sensors 412 for detecting aspects of the environment, including electromagnetic emissions from nearby computing devices or others of the lighting devices 204. As another class of examples, the sensors 412 may include one or more feedback sensors for detecting operational parameters of the device 204, such as the temperature and/or intensity or color characteristics of the light outputs of the LEDs 508. The sensors 412 may be connected to the processor 404 to facilitate collection, analysis, and communication of sensor data and/or data derived from the sensor data. Sensors may include ultrasonic sensors, video sensors, audio sensors, image sensors, optical sensors, temperature sensors, humidity sensors, air quality sensors, motion detection sensors, chemical sensors, radio frequency sensors, light intensity sensors, light color characteristic sensors, and the like. While the aforementioned sensor examples are contemplated, so are any other types of sensor that may detect an aspect of an environment into which the lighting device 204 may be deployed.

The lighting device 204 also includes power conditioning and distribution circuitry 510 coupled to receive power from the power mains provided to the lighting device 204, through a socket connection in the example of FIG. 5. The power conditioning and distribution circuitry 510 converts the power from the mains to one or more appropriate forms/levels required by the various electronic components of the lighting device 204 and distributes the converted power to those electronic components. Although deriving power from mains is shown and described for convenience, other power sources are contemplated, such as power over data networking, solar power, battery power, etc.

RF communication capabilities typically comply with some network-like standard, such as Bluetooth in our example. A Bluetooth network standard includes unique identifiers for each Bluetooth device that is connected to a wireless network. In a similar way, each RF enabled modulating light 204 may be configured with a unique RF wireless identifier. This RF wireless identifier may be used when determining a position of a properly equipped personal mobile device (e.g., a personal mobile device 219 with an RF capability, a camera capability, and a mobile device application for interacting with at least these two capabilities). While a capability to receive and process such an RF identifier may facilitate coarse device location, it is quite common for two or more RF wireless identifiers to be detectable in any of several positions due to the natural overlap of RF signals from nearby wireless devices. Therefore RF wireless identifiers alone may not be sufficient for fine position resolution. However, combining RF wireless identifier detection with modulated light detection techniques, may improve accuracy and performance.

One such way that improved performance may be achieved is through light namespace sharing. Because detection of a lighting device ID code from a modulated light output from a device 204 might require repeatedly receiving the modulated light to detect the specific device ID code, using an RF wireless identifier in combination with a modulated light type device ID may accelerate the determination of the lighting device ID code. This may be based on a known relationship between RF wireless identifiers and modulated lighting device ID codes, such as through a lookup function that accesses a dataset of identifiers/IDs that associates RF wireless identifiers with lighting device ID codes modulated on the light outputs of the devices 204. Even if two or more RF wireless identifiers are simultaneously detected due to RF signal overlap, determination of the corresponding modulated lighting device ID code for a device 204 may be much faster because the possible number of modulated light ID codes for devices 204 can be limited to those found in the lookup function for the simultaneously detected RF wireless identifiers.

The RF wireless identifiers modulated on the RF signals output by the transceivers 411 and antennas 410 of the lighting devices 204 may be inherent identifiers of the transceivers 411, e.g. wireless node IDs modulated on beacon or pilot channel signals broadcast by the transceivers 411 according to the BLE or other applicable wireless standard. Alternatively, the processors 504 may provide positioning/location system related node IDs to the transceivers 411 for inclusion in broadcast data messages.

Reference is now made to FIGS. 6A-6F, which schematically depict six states of operation of portions of an illustrative VLC positioning system 600 that implements an illustrative example of dynamic lighting device ID code assignment. One lighting device is treated in the simplified example of one re-assignment cycle, and other information that may be linked to lighting device ID codes in the master and mobile device versions of the look-up table are omitted, for convenience.

Figure 6A:
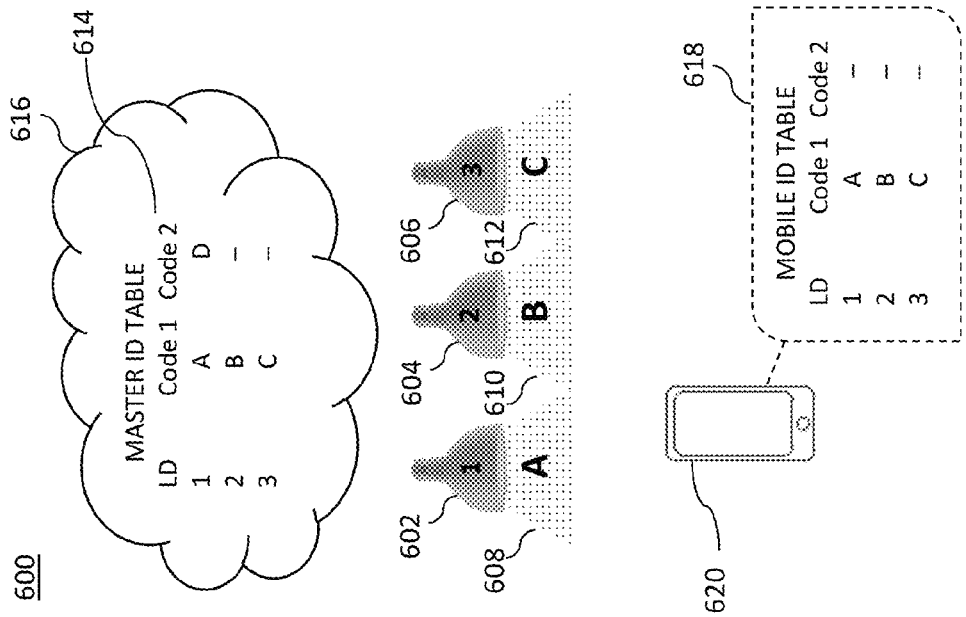

In FIG. 6A, three lighting devices 602, 604, 606 of system 600 are depicted as emitting modulated light cones 608, 610, 612. A master ID table 614 is depicted as residing in a control capability 616 of the VLC positioning system (represented by a cloudlike shape, although this capability typically may be implemented in a network connected server and/or database as in the earlier examples). A mobile ID table 618 is depicted as residing in a typical mobile device 620. Each ID table includes fields to associate a first code (Code 1) and a second code (Code 2) with each of the lighting devices (LDs) in the system 600.

In the state of operation of system 600 depicted in FIG. 6A, the contents of the master ID table 614 and the mobile ID table 618 are identical. Other mobile devices (not shown) served by system 600 contain identical copies of the mobile ID table 618 in the state of operation of FIG. 6A. Lighting device 1 602 is broadcasting ID code A, lighting device 2 604 is broadcasting ID code B, and lighting device 3 620 is broadcasting ID code C.

Figure 6B:
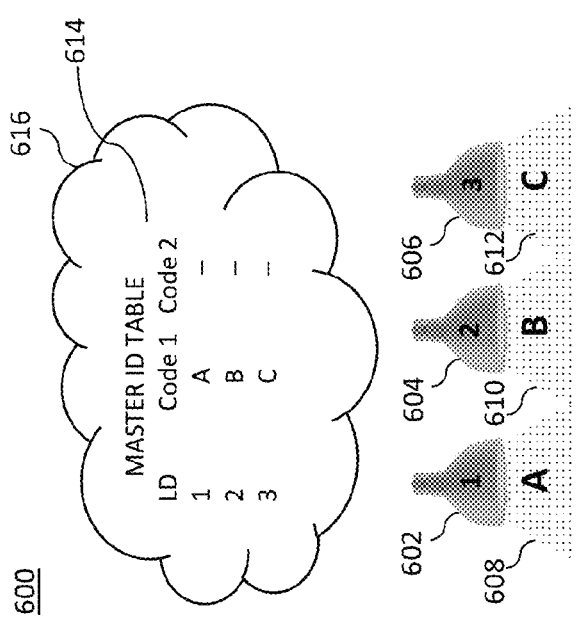

In FIG. 6B, a shifter ID code (code D) has been associated lighting device 1 in the master ID table 614. The lighting devices 602, 604, 606 continue to broadcast ID codes A, B, and C, respectively, and the mobile ID table 618 continues in the state depicted in FIG. 6A.

Figure 6C:
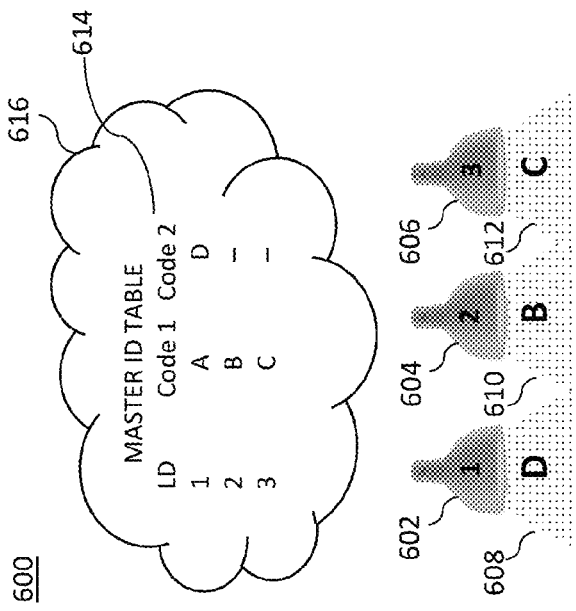

In FIG. 6C, the mobile device 620 has downloaded an update of its mobile ID table 618, and the contents of the mobile ID table 618 now match those of the master ID table 614. Of note, the entry for lighting device 1 in the mobile ID table 618 now includes both the previously assigned ID code A and the newly assigned shifter code D. Consequently, the mobile device 620 is now capable of identifying lighting device 1 602 correctly whether the mobile device 620 detects original code A or shifter code D. In the state shown in FIG. 6C, the mobile device 620 will detect the previously assigned code A broadcast from lighting device 1 620 and be able to perform the appropriate lookup with respect to that lighting device in the mobile ID table 614. Other mobile devices (not shown) served by system 600 may at this time contain copies of the mobile ID table 618 that are temporarily not identical with the mobile ID table stored in mobile device 620.

Figure 6D:
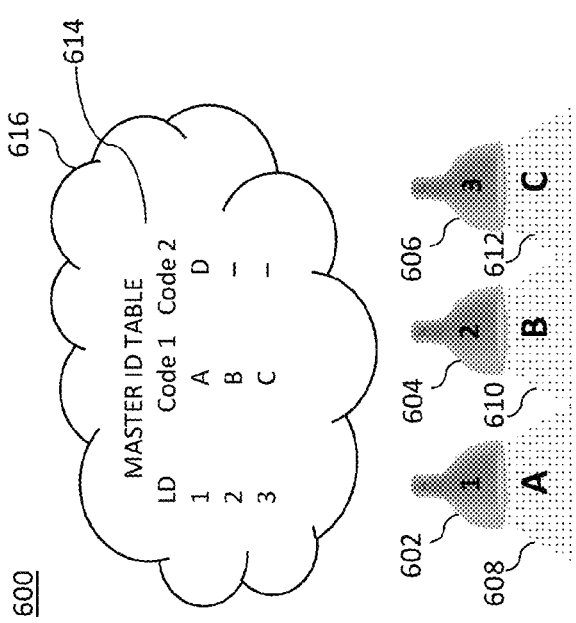

In FIG. 6D, the control capability 616 has commanded lighting device 1 602 to broadcast code D instead of code A. The entries in the master ID table 614 and the mobile ID table 618, however, have not changed and still include both the previously assigned ID code A and the newly assigned shifter code D. Consequently, in the state shown in FIG. 6D, the mobile device 620 will detect shifter code D broadcast from lighting device 1 602 and be able to perform the appropriate lookup with respect to that lighting device in the mobile ID table 614.

In FIG. 6E, the master ID table 614 has been altered to dis-associate code A from lighting device 1 602. The code A is now freed for use as a shifter code. Also in FIG. 6E, an update of the ID code lookup table has been downloaded to the mobile device 620. A single cycle of code reassignment has thus been completed with respect of one of the lighting devices. Any unfriendly mapper's ID table constructed when system 600 was in the state of FIG. 6A will now be partially inaccurate.

In FIG. 6F, the master ID table 614 has been altered to associate shifter code A with lighting device 2 604, beginning a next cycle of code reassignment. Each cycle of code reassignment will render an older unfriendly map more inaccurate. Reiterated, systematic code reassignment cycles will periodically refresh all ID code assignments. Randomization of shifter code assignments adds another layer of defense in various examples.

It should be clear to persons familiar with the art of telecommunications that the illustrative procedure shown in FIGS. 6A-6F for a single shifter code may be conducted using N shifter codes and N lighting devices simultaneously. Similarly, the ID tables depicted in FIGS. 6A-6F may, in various examples, contain or be linked to information not depicted herein.

In various examples, code reassignment impedes or defeats unfriendly mapping of a VLC positioning system because maps produced by detecting ID codes of lighting devices and associating those codes with spatial information become out of date.

In various examples of dynamically altering ID code assignments, wireless radio frequency (RF) nodes (e.g., Bluetooth low-energy transceivers, a.k.a. BLE nodes) are co-located with some or all modulated lighting devices of a VLC positioning system. Examples of VLC systems including such nodes are shown and described in the above incorporated US 2015/0147067 A1 publication. Typically, an RF node is detectable by mobile devices over a larger area than an individual modulated light source of one of the lighting devices. Thus, it is possible to group light sources within BLE node wireless zones and to re-use lighting device ID codes within non-contiguous BLE zones. For example, an ID code A may be used in a first BLE transmit/receive zone and simultaneously in another BLE transmit/receive zone within the same or another premises served by the optical based mobile positioning system. As outlined earlier BLE wireless nodes can broadcast distinctive RF wireless node identifiers, and the ID code lookup table employed by the VLC positioning system can be extended to include BLE identifier information. BLE identifiers may thus enable disambiguation of identical lighting device ID codes based on BLE zone identity, preserving system function with shorter lighting device ID codes. Re-use of lighting device ID codes permits the use of fewer unique lighting device lighting device ID codes and thus of a shorter ID code word, which is more rapidly broadcast then a longer lighting device ID code word and is therefore advantageous in various examples.

Additionally or alternatively, in various examples, data broadcast by a BLE node may be used by a mobile device to determine that the version of the lighting device ID code-to-position lookup table stored on the mobile device is out of date and that download of an update of that ID code table should be requested by the mobile device. For example, if a mobile device detects an ID code X in BLE zone 1, where the mobile device's ID code table does not list an ID code X, the mobile device can conclude that its lighting device ID code-to-position lookup table is out of date and request a fresh download. Such a requested download may happen through a wireless Internet connection (e.g., WiFi), through the BLE node signal, or in some other transmissive fashion.

Furthermore, in various examples, using BLE nodes, methods of device ID code reassignment may be applied to the BLE node identifiers as well as to the modulated lighting device ID codes, thus impeding unfriendly mapping of the BLE nodes as well as of the modulated lighting devices.

Figure 7:
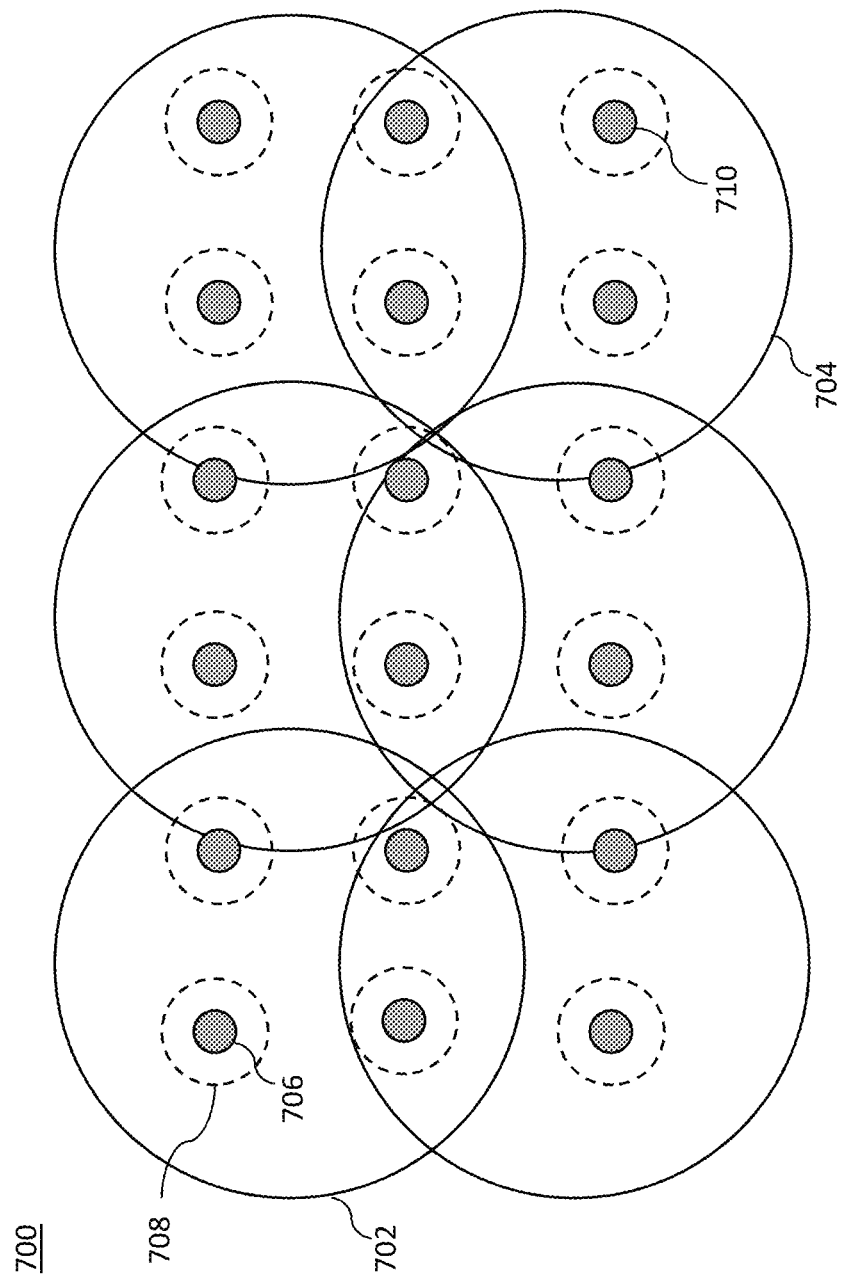
FIG. 7 is a schematic diagram of a number of lighting devices having code modulation and RF wireless communication capabilities, illustrating light ID code re-use in areas where the lighting device(s) have different RF wireless ID codes.

Reference is now made to FIG. 7, which schematically depicts portions of an illustrative VLC positioning system 700 that implements an example of the method of dynamic ID code reassignment used in conjunction with BLE zones.

System 700 includes six BLE zones (i.e., areas of reliable BLE reception for a particular BLE transceiver), each approximately circular and centered on a BLE transceiver node (not shown in this drawing). In FIG. 7, two of the six BLE zones are labeled, namely a first BLE zone 702 and a second BLE zone 704. The system 700 also includes a number of modulated VLC type lighting devices of the type discussed above relative to earlier drawings. In FIG. 7, two of the VLC lighting devices are labeled for discussion purposes, a first VLC lighting device 706 at the approximate center of a zone of likely detection 708 by mobile devices, denoted by a dashed circle and a second VLC lighting device 710. In the system 700, a lighting device ID code lookup table is maintained by or accessible by each mobile device to be (not depicted) served by the system 700. That table includes ID code information and physical location information for both BLE ID identifiers and VLC lighting device ID codes for the various system devices in the service area.

In various examples such as system 700 where BLE nodes broadcast distinctive BLE identifiers and VLC lighting devices broadcast distinctive VLC lighting device ID codes, VLC codes may be re-used in non-overlapping BLE zones. For example, a given VLC code may be used once in every BLE zone that does not overlap another BLE zone in which that same VLC lighting device code is used. For example, a VLC ID code A may be assigned to and broadcast by both the first VLC lighting device 706 in BLE zone 702 and the second VLC lighting device 708 in BLE zone 704. A mobile device detecting code A can look up the different information associated with the two lighting devices 706, 710, for example, to estimate mobile device location, based on detection of the different associated BLE identifiers.

This method of disambiguation allows re-use of VLC lighting device ID codes in a single service area, which reduces the total number of VLC lighting device ID codes needed and therefore the length of the VLC lighting device ID code. Also, if a mobile device detects a VLC lighting device ID code in a given BLE zone that is not listed in the ID lookup table, the mobile device can request refreshment of the mobile device version of the ID code table data and/or take other error-correction steps (since a non-tabulated VLC the mobile device ID code may result from mis-read of a correctly broadcast ID code; or, a correctly broadcast BLE ID code may be mis-read by the mobile device; or, inconsistencies may have corrupted the ID code table, in which case a control capacity of the system 700 may be alerted to the problem). The illustrative hybrid system of FIG. 7 may be combined with code reassignment as described hereinabove, resulting in various examples that support both shorter the mobile device ID codes and resistance to unfriendly mapping.

As shown by the above discussion, functions relating to the mobile device position determinations, related location based services and the ID code assignment for lighting devices in a system implementing such determinations/services may be implemented on computers connected for data communication via the components of a packet data network, operating as a server computer, user terminal and/or as mobile device. Although special purpose devices may be used, such devices also may be implemented using one or more hardware platforms intended to represent a general class of data processing device commonly used to run "server" programming, for example, to perform functions attributed to the configuration server discussed above, albeit with an appropriate network connection for data communication.

As known in the data processing and communications arts, a general-purpose computer typically includes a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the ID code to position lookup table and/or the updates thereof. The software code is executable by the general-purpose computer that functions as the configuration server and/or that functions as a mobile terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology to dynamically alter the assignment of ID code to any of the lighting devices of a light-based positioning system, in essentially the manner performed in the implementations discussed and illustrated herein.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that those skilled in the art are familiar with the structure, programming and general operation of such computer equipment and as a result the drawings should be self-explanatory.

Hardware of a server computer, for example (FIG. 8), includes a data communication interface for packet data communication. The server computer also includes a central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications. The hardware elements, operating systems and programming languages of such server computers are conventional in nature, and it is presumed that those skilled in the art are adequately familiar therewith. Of course, the server functions may be implemented in a distributed fashion on a number of similar hardware platforms, to distribute the processing load.

Hardware of a computer type user terminal device, such as a PC or tablet computer, similarly includes a data communication interface, CPU, main memory and one or more mass storage devices for storing user data and the various executable programs (see FIG. 9). A mobile device (FIG. 10) type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphone type mobile devices include similar but smaller input and output elements. Tablets and other types of smartphone type mobile devices utilize touch sensitive display screens, instead of separate keyboard and cursor control elements. In the example (FIG. 10), the mobile device also includes one or more rolling shutter type cameras, although other types of cameras, image sensors or optical detectors may be used. The hardware elements, operating systems and programming languages of such user terminal devices also are conventional in nature, and it is presumed that those skilled in the art are adequately familiar therewith.

Hence, aspects of the methods of alter the assignment of an identification (ID) code to one of the lighting devices of a light-based positioning system outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming and/or the relevant data. All or portions of the software and/or the relevant data may at times be communicated through the Internet or various other telecommunication networks. Such communications, for example, may enable loading of the programming and the database from one computer or processor into another, for example, from a management server or host computer of the positioning service provider into the computer platform of the configuration that is active and on-line to perform the relevant server functions in an actual working environment. Thus, another type of media that may bear the software elements and data includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:
1. A system, comprising:
a plurality of lighting devices, each lighting device comprising:
  a light source;
  a modulator, coupled to the light source to cause code modulation of light output of the light output of the source;
  a wireless communication transceiver; and
  logic/processing circuitry coupled to control the code modulation by the modulator and coupled to communicate via the transceiver; and
a computer, comprising:
  a network communication interface;
  a processor coupled to the network communication interface;
  data and programming storage, coupled to provide the processor access to data and programming stored in the storage;
  an identification (ID) code lookup table for a light-based positioning function of the system, maintained in the storage, the lookup table including an entry for each lighting device containing: a respective ID code previously assigned from among a group of available identification codes for modulation on a light output of the lighting device and position related information associated with the lighting device; and
  a program executable by the processor stored in the storage, wherein execution of the program configures the computer to perform functions, including functions to:
    (a) assign to each of some number of the lighting devices a respective different second ID code in addition to the respective previously assigned ID code;

(b) communicate an update of the lookup table, including updates relative to each respective lighting device in the number of the lighting devices to indicate assignment of the respective different second ID code to each respective lighting device in the number of the lighting devices along with the ID code previously assigned to each respective lighting device in the number of the lighting devices, through a network communication to one or more mobile devices,
to enable a mobile device to perform a lookup in the table to determine mobile device position based on either one of the respective ID codes assigned to one respective lighting device among the number of lighting devices demodulated from reception of the light output of the respective one lighting device; and
(c) subsequently cause each one of the number of lighting devices to begin modulating light output to carry the respective second ID code instead of the ID code previously assigned to the one of the number of lighting devices.

2. The system of claim 1, wherein the logic/processing circuitry of the lighting devices configure the lighting devices to form a wireless mesh network via the wireless communication transceivers.

3. The system of claim 1, wherein the modulators modulate respective assigned ID codes on light output from respective sources to:
implement a modulation technique selected from the group consisting of: amplitude modulation, optical intensity modulation, amplitude-shift keying, frequency modulation, multi-tone modulation, frequency shift keying (FSK), ON-OFF keying (OOK), pulse width modulation (PWM), pulse position modulation (PPM), ternary manchester encoding (TME) modulation, and digital pulse recognition (DPR) modulation; or
implement a combination of two or more modulation techniques selected from said group.

4. The system of claim 3, wherein the implemented modulation technique is configured to facilitate demodulation of ID codes from images captured by rolling shutter cameras of mobile devices.

5. The system of claim 1, further comprising:
programming executable on the mobile devices to perform lookups of entries in received versions of the lookup data and use data obtained via the lookups for mobile device position estimations,
wherein the programming executable on the mobile devices also is responsible for installing received table updates in the mobile devices.

6. The system of claim 1, wherein execution of the program configures the computer to perform further functions to:
subsequently, when the communication of the update should be complete and the number of lighting devices should have begun modulating light outputs to carry respective second ID codes, update the lookup table to remove the ID codes previously assigned to the number of lighting devices;
communicate, through the network communication via the interface to one or more mobile devices, another update of the lookup table, to indicate removal of the ID code previously assigned to each one of the number of lighting devices to disable a mobile device from performing a lookup in the table to determine mobile device position based on the ID code previously assigned to each one of the number of lighting devices; and
repeat functions (a) through (e) for another, different number of one or more of the lighting devices using the removed previously assigned ID codes.

7. A computer, comprising:
a network communication interface;
a processor coupled to the network communication interface;
data and programming storage, coupled to provide the processor access to data and programming stored in the storage;
an identification (ID) code lookup table for a light-based positioning system having a plurality of lighting devices, maintained in the storage, the lookup table including an entry for each lighting device containing:
a respective ID code previously assigned from among a group of available identification codes for modulation on a light output of the lighting device and position related information for the lighting device; and
a program executable by the processor stored in the storage, wherein execution of the program configures the computer to perform functions, including functions to:
(a) assign to each of some number of the lighting devices a respective different second ID code in addition to the respective previously assigned ID code;
(b) communicate an update of the ID code lookup table, including updates relative to each respective lighting device in the number of the lighting devices to indicate assignment of the respective different second ID code to each respective lighting device in the number of the lighting devices along with the ID code previously assigned to each respective lighting device in the number of the lighting devices, through a network communication to one or more mobile devices,
to enable a mobile device to perform a lookup in the table to determine mobile device position based on either one of the respective ID codes assigned to one respective lighting device among the number of lighting devices; and
(c) cause each respective lighting device in the number of the lighting devices to begin modulating its light output to carry the respective second ID code assigned to the respective lighting device instead of the ID code previously assigned to the respective lighting device.

8. The computer of claim 7, wherein execution of the program configures the computer to perform further functions to:
subsequently, when the communication of the update should be complete and the number of lighting devices have begun modulating light outputs thereof to carry respective second ID codes, update the entries for the number of lighting devices a second time to remove the respective ID codes previously assigned to the number of lighting devices leaving the entries in the lookup table for the number of lighting devices to include the second ID codes as the only ID codes respectively assigned to the number of lighting devices; and
communicate, through the network communication via the interface to one or more mobile devices, another update of the lookup table, including the second updating of the entries for the number of lighting devices to indicate removal of the respective ID codes previously assigned to the number of lighting devices.

9. The computer of claim 8, wherein execution of the program configures the computer to repeat functions (a) through (c) for different ones of the lighting devices using some of the ID codes previously assigned to the number of lighting devices as second ID codes assigned to the other, different ones of the lighting devices.

10. The computer of claim 9, wherein the entry for each respective lighting device further contains a respective wireless ID of a radio frequency wireless transceiver included in each respective lighting device.

11. The computer of claim 7, wherein the network communication interface enables the computer to communicate through the network with a mobile device in the vicinity of one of the lighting devices that provides a wireless communication link.

12. The computer of claim 7, wherein:
the lighting devices form a wireless mesh network, and
the network communication interface enables the computer to communicate through the wireless mesh network with each lighting device.

13. A non-transitory computer readable medium bearing a program, the program when executed by a computer implementing steps comprising:
in a light-based positioning system having a plurality of lighting devices, each lighting device having a respective previously assigned identification (ID) code, assigning to each of some number of the lighting devices a respective different second ID code in addition to the respective previously assigned ID code;
communicating an update of an ID code lookup table, including updates relative to each respective lighting device in the number of the lighting devices to indicate assignment of the respective different second ID code to each respective lighting device in the number of the lighting devices along with the ID code previously assigned to each respective lighting device in the number of the lighting devices, from the computer through a network communication to one or more mobile devices; and
enable a mobile device to perform a lookup in the table to determine mobile device position based on either one of the respective ID codes assigned to one respective lighting device among the number of lighting devices.

14. The medium of claim 13, wherein the steps further comprise communicating a subsequent update of the ID code lookup table, including updates relative to each respective lighting device in the number of the lighting devices, to remove the previously assigned ID codes.

15. The medium of claim 14, wherein the steps further comprise, after the subsequent update communication, re-assigning the removed previously assigned ID codes as second codes to others of the plurality of lighting devices.

16. A non-transitory computer readable medium bearing a program, the program when executed by a computer implementing steps comprising:
(a) maintaining an identification (ID) code lookup table for a light-based positioning system having a plurality of lighting devices, the lookup table including an entry for each respective lighting device containing: an ID code previously assigned from among a group of available identification codes for modulation on a light output of the respective lighting device and position related information associated with the respective lighting device;
(b) assigning a previously unassigned second ID code from among the group of available identification codes to one of the lighting devices;
(c) updating the entry for the one lighting device to add the second ID code in the lookup table, while the entry for the one lighting device continues to include the ID code previously assigned to the one lighting device;
(d) communicating an update of the lookup table, including the updated entry for the one lighting device to indicate assignment of the second ID code to the one lighting device along with the ID code previously assigned to the one lighting device, from the computer through a network communication to one or more mobile devices for installation in the one or more mobile devices, to enable a mobile device to perform a lookup in the table to determine mobile device position based on whichever one of the ID codes assigned to the one lighting device is demodulated from reception of light output from the one lighting device based on the updated entry for the one lighting device containing both ID codes assigned to the one lighting device; and
(e) causing the one lighting device to begin modulating light output from the one lighting device to carry the second ID code instead of the ID code previously assigned to the one lighting device.

17. The medium of claim 16, wherein the steps further comprise steps of:
subsequently, when the installation of the update should be complete and the one lighting device has begun modulating light output from the one lighting device to carry the second ID code, updating the entry for the one lighting device a second time to remove the ID code previously assigned to the one lighting device leaving the entry in the lookup table for the one lighting device to include the second ID code as the only ID code assigned to the one lighting device; and
communicating, through the network communication to one or more mobile devices, another update of the lookup table, including the second update of the entry for the one lighting device to indicate removal of the ID code previously assigned to the one lighting.

18. The medium of claim 17, wherein the steps further comprise, after the other update, repeating steps (b) through (e) for another, different one of the lighting devices using the ID code previously assigned to the one lighting device as a second ID code assigned to the other, different one of the lighting devices.

19. The medium of claim 16, wherein the entry for each respective lighting device further contains a respective wireless ID of a radio frequency wireless transceiver included in each respective lighting device.

* * * * *